Nov. 8, 1966　　　W. L. HARTER　　　3,283,384
APPARATUS FOR FORMING BUILDING BLOCKS

Filed Aug. 31, 1964　　　　　　　　　　　7 Sheets-Sheet 2

INVENTOR.
WARREN L. HARTER

BY Wells & St.John

ATTYS.

INVENTOR.
WARREN L. HARTER

United States Patent Office 3,283,384
Patented Nov. 8, 1966

3,283,384
APPARATUS FOR FORMING BUILDING BLOCKS
Warren L. Harter, P.O. Box 5166, Spokane, Wash.
Filed Aug. 31, 1964, Ser. No. 393,302
3 Claims. (Cl. 25—41)

This invention relates to a novel apparatus for producing cementitious building blocks by forming the blocks on a floor surface by a portable machine.

The apparatus described below provides a portable block making machine using a single reusable form capable of producing blocks intermittently and leaving the blocks on a supporting floor surface on which the machine itself travels. The machine is designed to provide a portable apparatus by which blocks can be produced on the site at which they are to be used. For instance, a building might be erected by first pouring a slab floor and then producing the blocks for the walls on that same floor prior to using the blocks to erect a wall. Also, warehouse facilities or other large floor areas might be used as manufacturing sites for a central producing machine to service a general building area.

The machine as shown is designed for cementitious blocks, preferably blocks that are made of a rather dry and rigid cement mix, using various types of aggregate. One type of material found to be most suitable is a slightly wet mix of cement with wood shavings utilized as aggregate. This type of mix can absorb a great deal of compaction and provides considerable dimensional stability immediately after being pressed into the desired configuration.

It is a first object of this invention to provide a rather simple machine for producing building blocks, the machine itself being capable of easy manipulation and ready repair.

Another object of this invention is to provide a machine that does not require individual forms for each block produced thereby. Only a single form is utilized in producing a single block, although the number of forms could obviously be multiplied in order to produce a multiple number of blocks in a single operation. Another object of this invention is to produce a machine where the form is stripped from the finished block in such a manner that damage to the block surfaces is eliminated and a consistently good side surface in each block is insured.

These and other objects will be evident from the following disclosure, taken together with the accompanying drawings, which form the basis for the claims set out at the end of the specification. It is to be understood that the claims themselves are intended to be the defining elements of the invention and that the precise example to be described is not meant to limit the scope of the invention defined thereby.

In the drawings:

FIGURES 11 through 15 are a series of sectional diagrammatic views illustrating the steps utilized in producing blocks with this machine;

The apparatus by which blocks are formed according to this invention is shown in detail in FIGURES 1 through 9. Principally, it involves a portable or mobile framework 10 that is adapted to be supported on a supporting floor surface for movement across that surface transverse to the length of the machine. The framework includes top longitudinal channels 11 that run along its full length and which are connected by end channels 12 to complete a top rectangular frame. There also is provided a pair of lower longitudinal channels or braces 13 extending along the full length of the machine parallel to the channels 11 and spaced above the supporting floor surface, which is generally designated in FIGURE 1 by the numeral 9. The channels 11 and 13 are connected by means of upright guide channels 14, the channels 14 at the far right of the machine and adjacent its center being inwardly directed channels that face one another to provide fixed guide tracks for the movable form described below.

Figure 1:
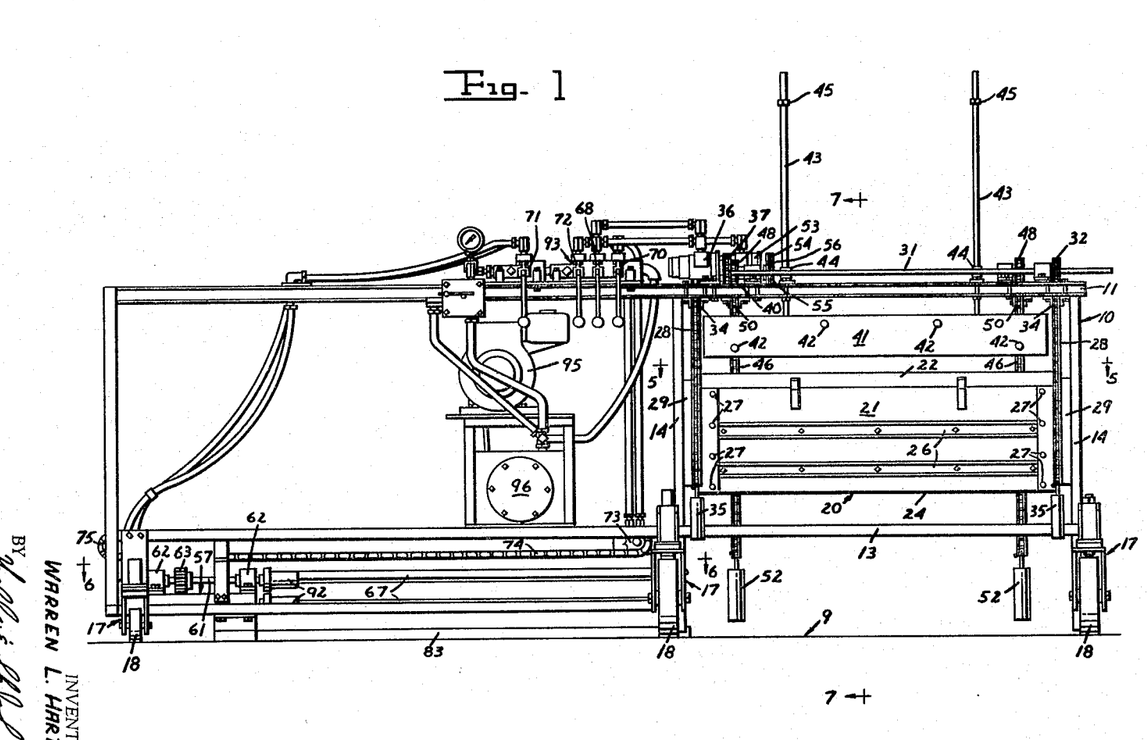
FIGURE 1 is an elevation view of an apparatus constructed according to this invention.

At the lower ends of the two sets of guide channels 14 are provided upright guide plates that serve to position the core forming apparatus. The inner guide plate is designated by the numeral 15 and the outer guide plate is designated by the numeral 16. The framework 10 is movably supported on the floor surface 9 by means of three longitudinally spaced sets of wheels 18 carried on the framework 10 by respective wheel supports 17. The angular direction of the wheels 18 are fixed relative to the framework 10 so that the framework 10 can be moved transversely to its length when so desired. The framework 10 as seen in the drawings would be manually moved, although it is quite obvious that the wheels 18 can be mechanically powered.

Figures 4, 5:
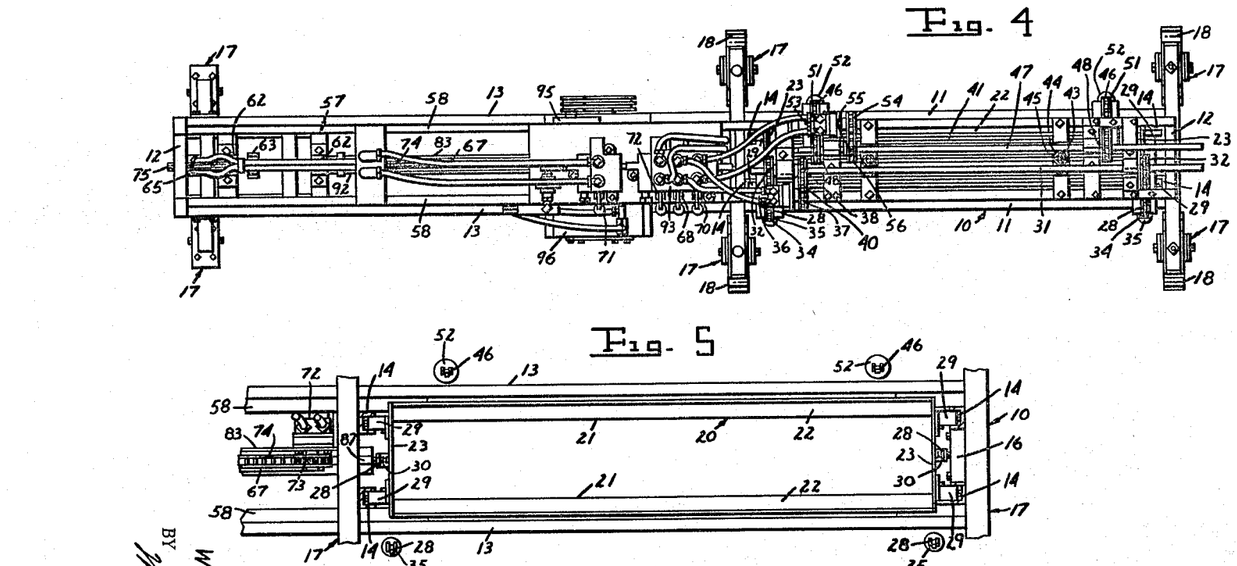
FIGURE 4 is a top view of the apparatus shown in FIGURE 1.
FIGURE 5 is an enlarged sectional view of the apparatus as seen along line 5—5 in FIGURE 1.
Figure 7:
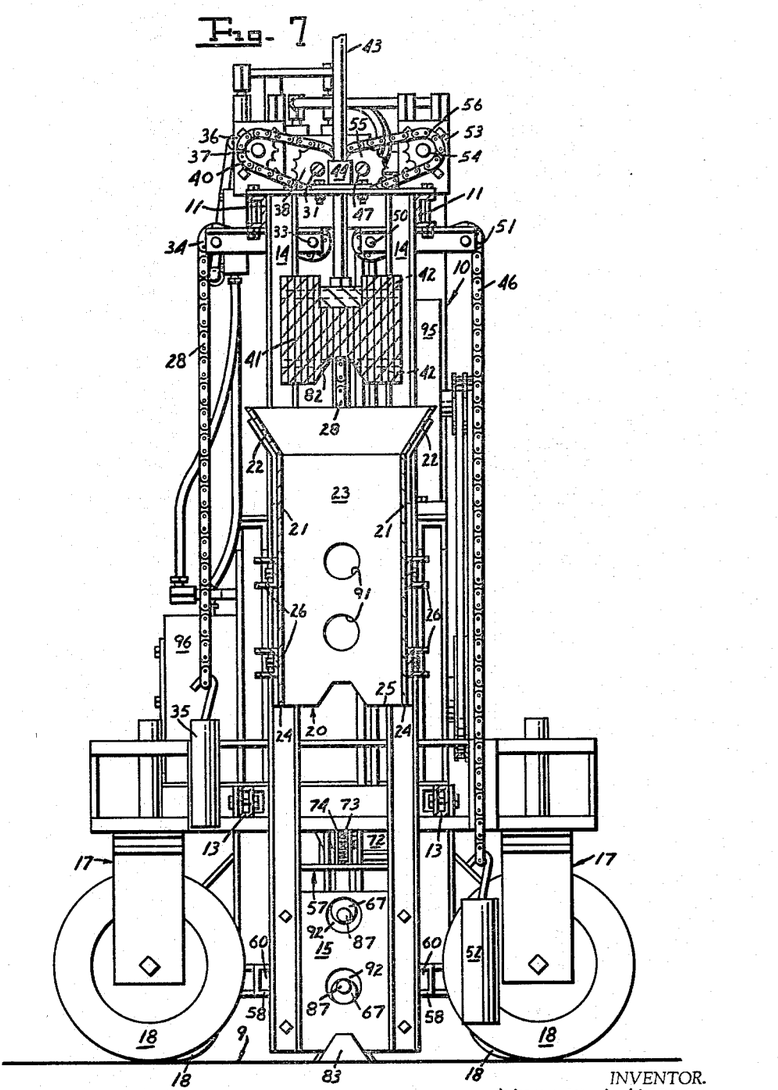
FIGURE 7 is an enlarged sectional view of the apparatus as seen along line 7—7 in FIGURE 1.

The basic form 20 within which the block is cast is best seen in FIGURES 1, 5, and 7. It includes a pair of upright parallel sides 21 that extend longitudinally along a portion of the framework 10 between the two pairs of upright guide channels 14 previously described. The sides 21 are provided with an upper flange 22 bent angularly outward to facilitate the reception of cementitious material within the form 20. Sides 21 are joined by end panels 23, the lower edges 24 of the sides 21 and the lower edges 25 of the end panels 23 lying in a common horizontal plane. The sides 21, due to their length, are preferably reinforced by external channels 26 secured to them.

The sides 21 are fastened to the end panels 23 by means of releasable screws 27, so that blocks or shims can be utilized to vary the width of the form 20 by adjustment of the separation between the respective sides 21. Each end panel 23 is provided with vertical guides 29 that are slidably received within the inwardly facing guide channels 14 so that the form 20 is slidably mounted in the framework 10 for elevational movement between its lowered position wherein it abuts the floor surface 9 and an elevated position vertically above the lowered position. The sides 21 and the end panels 23 have smooth vertical inner surfaces on which the side and end surfaces of the block are formed.

Figure 2:
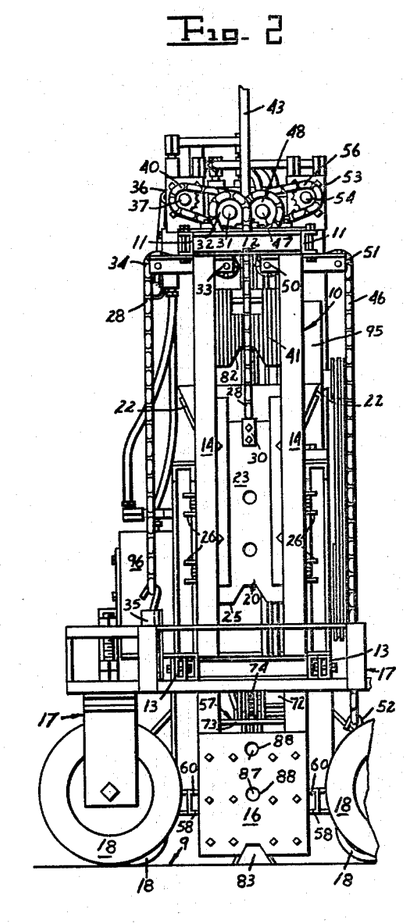
FIGURE 2 is an enlarged end view of the apparatus as seen from the right in FIGURE 1, a portion of the wheels and upper guide rods being broken away.
Figure 3:
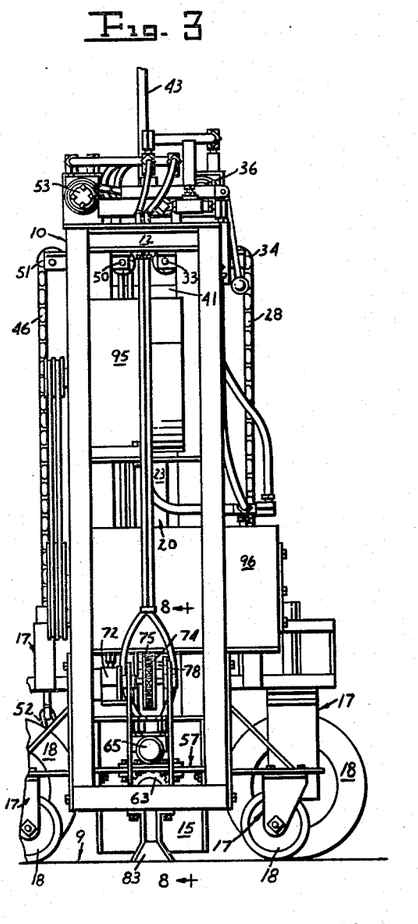
FIGURE 3 is a view similar to FIGURE 2, taken from the left hand end of the machine.

The form 20 is lifted by means of two chains 28 connected to the form 20 at its respective end panels 23, the connections being designated by the numeral 30 (FIGURE 2). The chains 28 are powered by means of a driven shaft 31 rotatably mounted at the top of framework 10. Fixed to the shaft 31 are two driven sprockets 32 over which the respective chains 28 pass. The chains 28 also pass under idler sprockets designated by the numeral 33 and over outside idler sprockets designated as 34. The free end of each chain 28 is provided with a weight 35 whose function is to insure correct engagement of the chain 28 with the sprockets 32 through 34.

The shaft 31 is powered by means of a reversible fluid motor 36 that drives the shaft 31 through a driving sprocket 37 and a driven sprocket 38 fixed to the shaft 31. Sprockets 37 and 38 are connected by a small closed chain 40. Thus, the motor 36 can be utilized to raise or lower the form 20 as might be desired.

Vertically aligned with the form 20 is a weighted block 41, again best seen in FIGURES 1, 2, and 7. The block 41, as shown in the drawings, is fabricated from a series of metal plates bolted to one another in vertical positions by means of transverse connecting bolts 42. The purpose of this construction is to allow the removal of individual plates so as to vary the width of the block 41 to complement the width of the form 20. The block 41 has an external periphery, as seen in a cross section cut through a horizontal plane, that is complementary to the internal configuration of form 20 in a cross section cut through a parallel horizontal plane. Therefore, the block 41 has a configuration that can be slidably received within the form 20 for movement relative thereto.

Block 41 is slidably mounted in the framework 10 by means of upwardly extending guide rods 43 whose lower ends are fixed to the block 41. The rods 43 in turn are slidably carried within fixed collars 44 on the framework 10. At their upper ends, the rods 43 are provided with longitudinally adjustable nuts 45 which serve to limit downward movement of the rods 43 and therefore block 41. The block 41 is elevationally positioned by means of two chains 46 having one end of each fixed to the block 41 in much the same manner as previously described relative to chains 28. The chains 46 are controlled through a drive shaft 47 located adjacent to the shaft 31. Chains 46 pass over driven sprockets 48 fixed to the shaft 47, under idler sprockets 50 and over idler sprockets 51. The outer ends of the chains 46 hang at the side of the machine opposite to the chains 28 and are also provided with weights 52 to insure their correct engagement with the sprockets 48, 50, and 51.

The shaft 47 is turned by means of a reversible fluid motor 53 that drives a sprocket 54. The sprocket 54 in turn rotates a driven sprocket 55 on the shaft 47 by means of a short connecting chain 56.

Figures 9, 10:
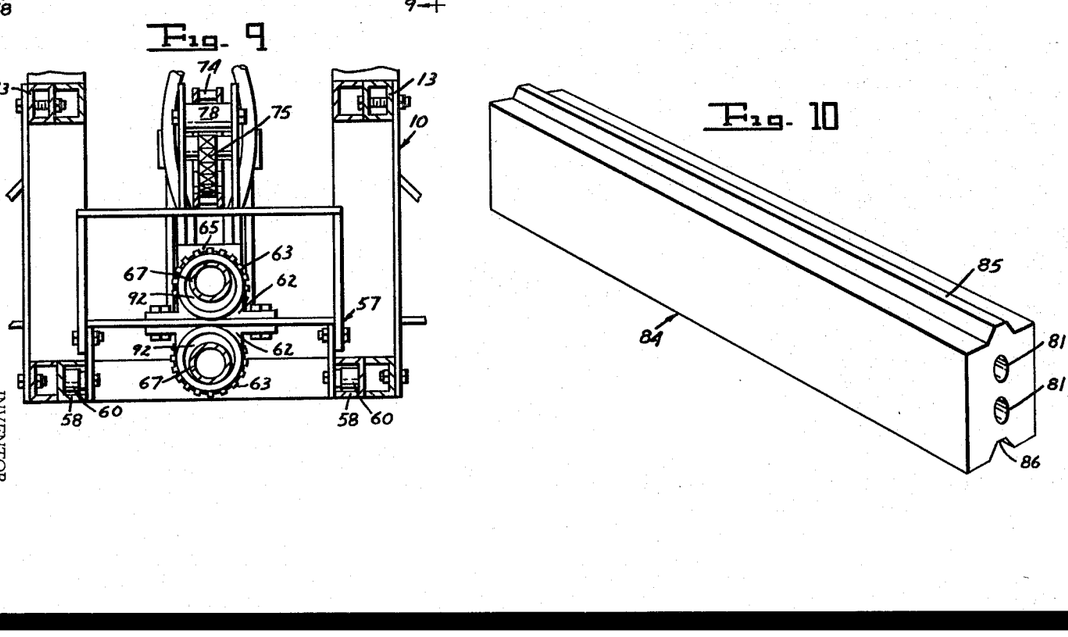
FIGURE 9 is an enlarged sectional view of the core producing apparatus as seen along line 9—9 in FIGURE 8.
FIGURE 10 is a perspective view of a block produced by this apparatus.

The building block formed by this apparatus is shown in one form in FIGURE 10. The block is designated by the numeral 84 and is generally rectangular in shape, its length being considerably greater than its height or width. The block 84 is shown with a longitudinal tongue 85 formed at its top surface and a complementary longitudinal groove 86 formed along its lower surface, so that successive blocks 84 can be readily stacked and aligned. The block 84 is also provided with longitudinal cylindrical apertures or cores 81 which are hollow and which extend throughout its length.

The tongue 85, when desired, is produced by forming a complementary groove 82 along the bottom surface of the block 41 (FIGURE 7). The groove 82 could be of a different cross sectional configuration, depending upon the design of the block 84.

Figure 6:
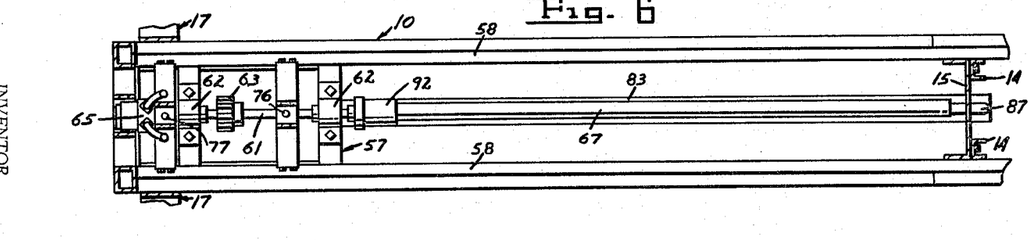
FIGURE 6 is an enlarged sectional view of the apparatus as seen along line 6—6 in FIGURE 1.
Figure 8:
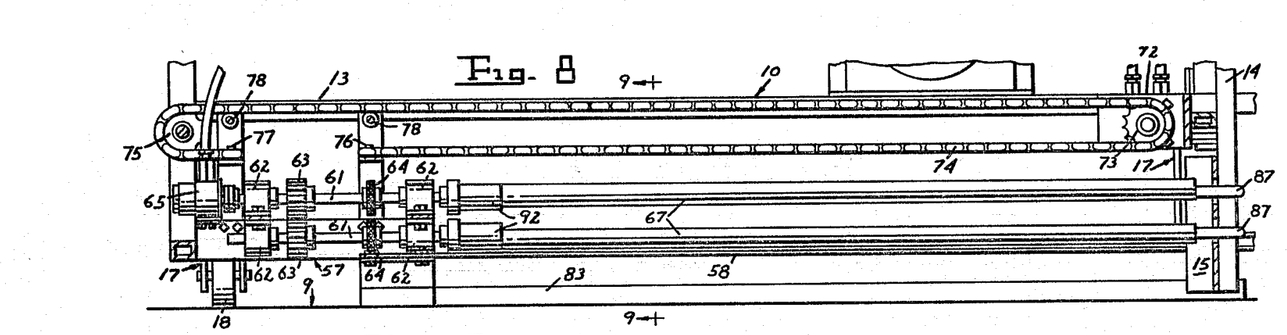
FIGURE 8 is a view of the core producing apparatus as seen along line 8—8 in FIGURE 3.

The hollow apertures or cores 81 in the block 84 are produced by a core producing apparatus seen to the left in FIGURE 1 and shown in detail in FIGURES 6, 8 and 9. The apparatus is movably mounted on the framework 10 by means of a supporting carriage 57. The carriage 57 is guided along bottom channels 58 extending partially across the length of the framework 10 adjacent to the floor surface 9. Carriage 57 is supported by rollers 60 which fit within the respective inwardly facing channels 58 (FIGURE 9).

The core producing apparatus is supported by longitudinal shaft 61 rotatably mounted on the carriage 57 by means of bearings 62. The shafts 61 are parallel to one another and extend perpendicularly relative to the end panels 23 of the form 20. Shafts 61 are shown in the drawings as provided with intermeshing gears 63 so that the shafts 61 will be turned in opposite rotational directions. As an alternative to this connection, where also is provided a pair of sprockets 64 fixed respectively to the individual shaft 61. By connecting the sprockets 64 by a chain (not shown) entrained over the two sprockets 64 and by releasing the gears 63, the two shafts 61 can alternately be turned in identical rotational directional directions. As shown in the drawings, the upper shaft 61 is driven by a fluid motor 65 mounted on the carriage 57 by means of a conventional coupling 66.

Each shaft 61 mounts a length of tubing 67 which is located in an eccentric position relative to the longitudinal central axis of the shaft 61 on which it is carried. The length of eccentric tubing 67 is the same in length as the inside length of the form 20, so that the tubing 67, when inserted through the form 20, will extend through its complete length. At their outer ends, each length of tubing 67 is provided with a stub shaft 87 which is coaxially aligned with the respective shaft 61 on which the tubing 67 is carried. The stub shafts 87 are adapted to be rotatably received within bearing apertures 88 formed at the far right of the framework 10 and best seen in FIGURE 2. Likewise, similar apertures 90 are formed through the outside end panel 23 of the form 20. The inner end panel 23 is provided with enlarged apertures 91 (FIGURE 7) that rotatably journal coaxial collars 92 formed on each of the shafts 61. The eccentric tubes 67, when rotated, will form cores within the cementitious material having a diameter equal to the diameter of the collars 92.

The carriage 57 is reciprocated relative to the framework 10 in a direction perpendicular to the direction of movement of the form 20 and block 41. This is accomplished by means of a hydraulic motor 72, which also is reversible, mounted on the framework 10 adjacent the center of the framework 10 and shown in FIGURE 8. The motor 72 turns a driving sprocket 73 on which is entrained a chain 74. The lower flight of the chain 74 has one end connected at 76 to an upstanding bracket on the carriage 57. The remaining end of chain 74 passes over an idler sprocket 75 at the far left of the framework as shown in FIGURES 1 and 8 and is connected to a similar bracket at 77. The brackets on which the connections 76 and 77 are located each are provided wth guide rolls 78 that serve to support the intermediate portions of the upper flight of chain 74. In this manner, rotation of sprocket 73 will cause the carriage 57 and the core producing apparatus mounted thereon to reciprocate to the right or left as shown in FIGURE 1.

The controls for the various motors are all located at the top of the framework 10 on a plate designated by the numeral 93. There are provided conventional valves to operate the respective motors, each of which is reversible. As seen in FIGURE 1 and also in FIGURE 4, there is provided a valve 68 for the motor 36 that elevationally positions the form 20. A valve 70 is provided for the motor 53 that elevationally locates the block 41. The controls also include a valve 71 for the motor 65 that rotates the shaft 61 and a valve 94 for the motor 72 that reciprocates the carriage 57. In order to provide complete portability, the apparatus is shown with a conventional motor 95 and hydraulic compressor and reservoir unit 96. In this manner, no external controls or connections are required for the completely self-contained machine.

The groove 86 at the bottom of the block 84 has been previously described relative to FIGURE 10. When such a groove is desired or required, it can be easily produced by utilizing a forming member 83 complementary to its desired configuration. The member 83 is shown in FIGURES 2, 3, 6, 7, and 8 and is simply a solid bar slidably mounted on the floor surface 9 and fixed to the carriage 57 so that it will reciprocate along with carriage 57 and the core producing apparatus described. The lower ends of the framework members and panels 23 that would be intersected by the member 83 are grooved complementary to its configuration so that it can reciprocate without obstruction.

The operation of this apparatus can best be seen in FIGURES 11 through 15. The apparatus is designed to be utilized with a rather dry cementitious material such as a mixture of moist cement and wood shavings or other aggregate. The mix must be such that the formed block 84 is capable of maintaining its dimensions immediately after being produced.

Figure 11:
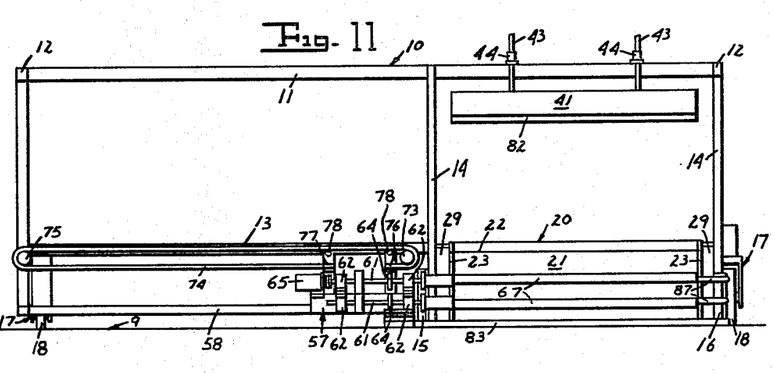
FIGURE 11 is a view showing the apparatus prepared to receive a charge of material.
Figure 12:
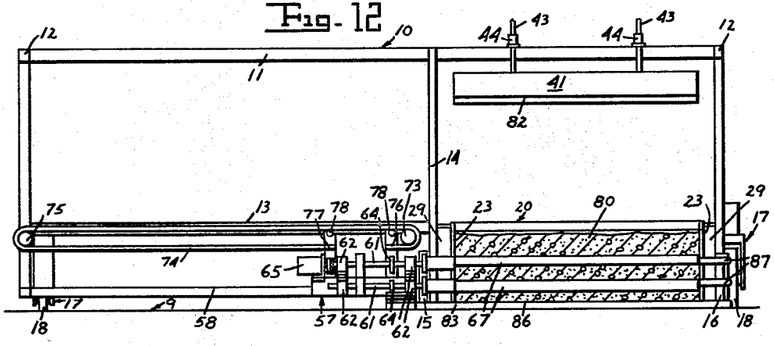
FIGURE 12 shows the material after being placed in the form.

In FIGURE 11 the machine is shown ready for the reception of the cementitious material. The form 20 is first lowered to the floor surface 9 by operation of the motor 36. The eccentric tubes 67 are then reciprocated by causing carriage 57 to travel to the right, the stub shafts 87 being rotatably journalled in the right end of the framework 10. The carriage 57 is reciprocated by operation of the motor 72. The block 41 is shown in an elevated position held in place by the respective chains 46.

Figure 13:
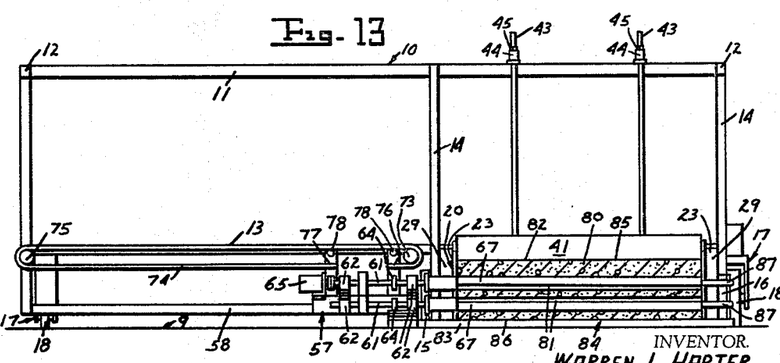
FIGURE 13 illustrates the pressing of the material from the top of the form where the compactors are rotating.

The material is then poured into the form 20, and the motor 65 is operated to cause the tubes 67 to compact and consolidate the material as it is being received in the form 20. When a complete charge of material 80 is received within the form 20, the block 41 is lowered through the upper end of form 20 as shown in FIGURE 13. The charge of material 80 shown in FIGURE 12 must be pre-measured, and will be of a volume such as to produce the complete desired block after compression by the block 41 and the rotation of the tubes 67. The block 41 is allowed to lower due to its own weight by rotation of the motor 53.

The weight of block 41 and the continued compaction due to the revolution of the tubes 67 will cause the material 80 to settle in the form 20 and produce a compacted cementitious block 84. The degree of compaction will be dependent upon the time involved, and the apparatus is designed to be preset to produce a particular block by proper placement of the stop nuts 45 on the guide rods 43.

Figure 14:
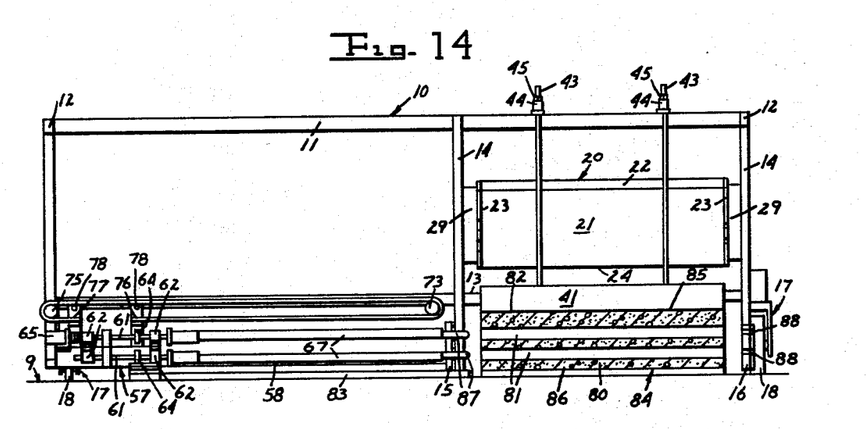
FIGURE 14 illustrates the stripping of the form from the formed block after removal of the core device.
Figure 15:
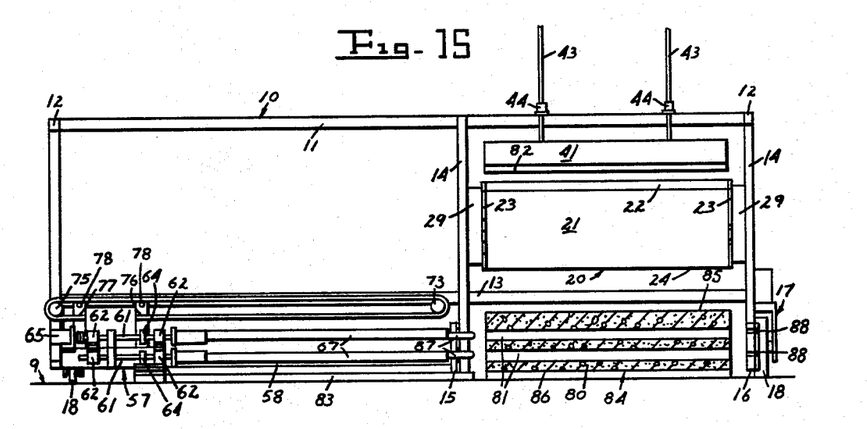
FIGURE 15 shows the completed block with the machine ready to be moved to a new location.

Rotation of the tubes 67 is then continued until the block 41 has finally settled to a position with both nuts 45 abutting the respective collars 44. At this time, the form 20 must be raised, although the tubes 67 must first be retracted to the left as shown in FIGURE 14. After the tubes 67 have been properly retracted so as to clear the form 20, form 20 is raised by operation of the motor 36, pulling upwardly on the chains 28. The weight of the block 41 will prevent the newly formed block 84 from rising with the form 20, so that the block 84 is stripped from the form 20 by this action. After the form 20 has been raised, the block 41 is then elevated by means of the motor 53 and chains 46 to cause it to pull through the form 20 as shown in FIGURE 15. At this time, the building block 84 rests on the floor surface 9, and has the desired longitudinal cores 81, lower groove 86, and upper tongue 85. The block 84 is then allowed to remain at rest on the floor surface 9, and the machine is moved transversely for production of another block in a side by side fashion.

The operation of the device is very simple and can be performed by one person without a great deal of skill or training. The nature of a particular block formed in the apparatus will be dependent upon the nature of the material and the amount of compaction will, in any event, be less than that amount which would cause bulging of the block 84 after stripping of the form 20. The shape of the final block, if compaction is controlled properly, can be very uniform, and the blocks produced can be readily stacked on one another with the interlocking tongues 85 in grooves 86 to produce a straight wall.

Modifications will appear evident to those skilled in this field. The device is not to be limited to a machine to produce a single block, since the apparatus described can be duplicated in either end to end relation or side by side relation to produce multiple blocks in a single operation. Other mechanical modifications can be made, and other devices used to move the various components described.

Having thus described my invention, I claim:

1. An apparatus for forming building blocks of compactable cementitious material, comprising:

a support framework movably mounted on a plane horizontal supporting surface for movement relative to said surface;

a rectangular form having parallel upright longitudinal sides and perpendicular end panels fixed to the end edges thereof, the sides and end panels of the form including co-planar lower edges, said form being carried on said framework for vertical movement relative to said framework between a first position wherein the lower edges of said form rest on the horizontal supporting surface for the framework and an elevated position vertically above said first position;

longitudinal core forming means movably mounted on said framework for reciprocable motion relative to said framework along the length of said form when said form is located at its first position relative to said framework;

said core means comprising:

a pair of longitudinal shafts, each shaft being rotatably mounted at one end thereof about axes parallel to one another on a platform movably carried on said framework for reciprocating movement of said platform relative to said framework in directions parallel to the shaft axes, the remaining ends of said shafts being receivable, after insertion through said form, within bearings located on the framework and aligned coaxially with the respective shaft axes;

a longitudinal eccentric surface formed integrally on each of said shafts intermediate the ends thereof;

and power means on said framework operatively connected to said shafts to selectively rotate said shafts about their respective axes;

and power means on said framework operatively connected to said shafts to selectively rotate said shafts about their respective axes;

and a weighted block mounted on said frame in vertical alignment with said form, the exterior cross sectional configuration of said block in a horizontal plane being complementary to the interior cross sectional configuration of said form in a parallel horizontal plane, said block being aligned on said framework relative to said form concentrically with said form for sliding motion therethrough.

2. An apparatus for forming building blocks of compactable cementitious material, comprising:

a rigid support framework mounted on a plane horizontal supporting surface for movement transverse to the length of the framework;

a rectangular form having transversely spaced longitudinal sides including opposed vertical planar inner surfaces located parallel to one another and end panels connected to the sides at the end edges thereof including opposed vertical planar inner surfaces, said sides and end panels being provided with coplanar lower edges located in a horizontal plane parallel to the floor surface, said form being movably mounted on said framework for vertical motion relative to the framework between a first position wherein said lower edges rest upon the floor surface and a second position vertically aligned above said first position;

means on said framework operatively connected to said form for effecting movement of said form between said first and second positions thereof;

longitudinal core forming means movably mounted on said framework for reciprocable motion relative thereto at an elevation intersecting said form when in its first position, said core forming means being movable between a first position clear of the path of movement of said form between its first and second positions and a second position extending through the end panels of said form and along the full length of the form sides when the form is in its first position;

said core means comprising:

a pair of longitudinal shafts each rotatably mounted at one end thereof about axes parallel to one another on a platform movably carried on said framework for movement of said platform relative to said framework in directions parallel to said shaft axes, the remaining ends of said shafts being receivable, after insertion through said form, within bearings located on said framework aligned coaxially with the respective shaft axes;

a longitudinal eccentric surface formed integrally on each of said shafts intermediate the ends thereof;

and power means on said framework operatively connected to said shafts for rotating said shafts about their respective longitudinal axes;

a block mounted on said frame directly above said form, the outer cross sectional configuration of said block in a horizontal plane being complementary to the inside cross sectional configuration of said form in a parallel horizontal plane, the block being movably aligned on said framework for vertical sliding motion relative to said form through the interior thereof;

and means on said framework operatively connected to said block adapted to vertically position said block relative to said framework.

3. An apparatus as defined in claim 2 wherein the lower surface of said block has formed therein a longitudinal groove;

and means carried on said platform for movement conjointly with said shafts relative to said framework positionable across the bottom of said form to produce a groove in building blocks formed on the floor surface complementary to the groove formed in the lower surface of said block.

References Cited by the Examiner

UNITED STATES PATENTS

| 773,709 | 11/1904 | Britain | 25—41 |
| 805,914 | 11/1905 | Horr | 25—41 |
| 1,514,980 | 11/1924 | Mathis | 25—41 |
| 2,892,218 | 6/1959 | McGhee et al. | 25—36 |
| 3,096,556 | 7/1963 | Woods | 25—36 |
| 3,159,897 | 12/1964 | Ellis et al. | 25—41 |

FOREIGN PATENTS 966,636  3/1950  France.

J. SPENCER OVERHOLSER, *Primary Examiner.*

G. A. KAP, R. D. BALDWIN, *Assistant Examiners.*